Patented Oct. 27, 1931

1,829,082

UNITED STATES PATENT OFFICE

GUSTAV BERGEN, FELIX ENGELHARDT, AND RICHARD STECKHAN, OF BRUNSWICK, GERMANY

PROCESS OF MANUFACTURING COLORED PORTLAND CEMENT

No Drawing. Application filed February 26, 1927, Serial No. 171,367, and in Germany January 27, 1927.

Our invention relates to improvements in the process of manufacturing colored Portland cement, and the object of the improvements is to provide a process by means of which a weatherproof colored Portland cement can be manufactured at low cost.

With this object in view our invention consists in mixing a ground raw material suitable for manufacturing cement with substances such as phosphates, borates, or halogen compounds which when heat is applied the materials are fluxed into molten matter, and in adding to the said raw material metal compounds such as oxide of chromium, nickel, cobalt, copper and the like, which are adapted to color the clinker produced in the manufacture of the cement.

In one example of our improved process we mix the ground raw material with fluor spar, borax and oxide of chromium, and treat the mixture in the manner known in the art to transform the same into cement. Preferably, suitable reducing matter such as coke is admixed with the raw material prior to sintering the same. By adding the said substances a cement is produced which has a pure green color, and in which the coloring matter is not mechanically admixed with the cement, but is combined therewith into a uniform and stable material.

Instead of adding the said coloring matter to the cement, we may make use of suitable raw materials containing a part or the whole of the coloring matter.

If the raw material contains iron oxide, we prefer to reduce the same into metal by burning the material in a reducing flame, and thereafter to remove the reduced iron by known methods.

Preferably the amount of the substances added to the raw material is such that the sintering or melting point of the bricks is reduced.

*Example 1.*—We mix 100 kg. of the ground raw material with 4 kg. of fluor spar, 1 kg. of borax, and 0.5 kg. of chromium oxide, and burn the mixture at a sintering temperature in a furnace. The clinker thus obtained is ground and further treated for manufacturing cement therefrom.

*Example 2.*—We mix 100 kg. of the ground raw material with 4 kg. of fluorspar, 1 kg. of borax, and 0.5 kg. of chromium oxide, add 1 kg. of coke, and burn the mixture at a sintering temperature in the reducing flame of a furnace. The clinkers thus obtained is ground and further treated for manufacturing cement therefrom.

The use of borax in conjunction with metal oxides for coloring the clinker gives rise to the formation of colored borosilicates in analogy to colored glass.

With the use of sodium phosphate similar reactions occur as follows:

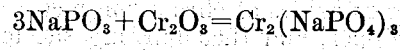

or

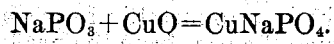

With the oxidizing flame the use of one percent of chromium oxide produces a bright green cement according to Example 1. If a weak reducing flame be used in conjunction with an admixture of three-fourths percent of chromium oxide according to Example 2 then terra-cotta red cement is produced.

We claim:

1. A process of making colored Portland cement comprising the steps of incorporating with the ground limestone and clay a flux of the group consisting of phosphates, borates, and halogen compounds, also adding thereto a compound of the group consisting of oxides of chromium, nickel, cobalt and copper to react with the flux to form coloring compounds and then burning the mixture to form clinkers.

2. A process for the manufacture of colored Portland cement from raw materials containing iron said process comprising the steps of mixing with the ground raw materials a flux of the group consisting of phosphates, borates and halogen compounds, also adding thereto a compound of the group consisting of oxides of chromium, nickel, cobalt and copper, burning the mixture with a reducing flame to form clinkers and to reduce the iron to metallic form whereupon said oxides react with the flux to form coloring compounds, and removing the metallic iron from the product.

3. A process of making colored Portland cement comprising incorporating with the ground raw materials a flux and a coloring compound of the group consisting of oxides of chromium, nickel, cobalt and copper, and then burning the mixture to form clinkers whereby the flux and the metallic oxides react to color the cement.

4. A process as claimed in claim 1, the amount of added substances being such as to reduce the sintering or melting point materially.

5. A process of making colored Portland cement comprising incorporating with the ground raw material containing iron, a flux and a coloring compound of the group consisting of oxides of chromium, nickel, cobalt and copper, burning the mixture in a reducing flame, and removing the metallic iron.

6. A process of making colored Portland cement comprising the steps of incorporating with the raw materials, fluor spar, borax and a compound of the group consisting of oxides of chromium, nickel, cobalt and copper, and then burning the mixture to form clinkers.

7. A process of making colored Portland cement comprising the steps of incorporating with the raw materials containing iron, fluor spar, borax and a compound of the group consisting of oxides of chromium, nickel, cobalt and copper, and then burning the mixture with a reducing flame to form clinkers and to reduce the iron to metallic form and removing the metallic iron from the product.

8. A process of making colored Portland cement comprising incorporating in intimate mixture with the ground raw materials fluxes of the group consisting of borates, phosphates and halogen compounds and metallic coloring compounds which react with the fluxes under heat treatment to color the cement, and burning the mixture.

In testimony whereof we have hereunto set our hands.

GUSTAV BERGEN.
Dr. FELIX ENGELHARDT.
RICHARD STECKHAN.